US008806196B2

(12) United States Patent
Metke et al.

(10) Patent No.: US 8,806,196 B2
(45) Date of Patent: Aug. 12, 2014

(54) METHOD AND APPARATUS FOR AUTHENTICATING A DIGITAL CERTIFICATE STATUS AND AUTHORIZATION CREDENTIALS

(75) Inventors: Anthony R. Metke, Naperville, IL (US); Erwin Himawan, Chicago, IL (US); Shanthi E. Thomas, Hoffman Estates, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 85 days.

(21) Appl. No.: 13/289,356

(22) Filed: Nov. 4, 2011

(65) Prior Publication Data

US 2013/0117558 A1 May 9, 2013

(51) Int. Cl.
*H04L 29/06* (2006.01)
*H04L 9/32* (2006.01)
*G06F 21/33* (2013.01)

(52) U.S. Cl.
CPC .......... *H04L 9/3268* (2013.01); *H04L 63/0823* (2013.01); *G06F 21/33* (2013.01)
USPC .................. 713/156; 713/175; 726/6; 726/10

(58) Field of Classification Search
CPC ........................... H04L 9/3268; H04L 63/0823
USPC .............................. 713/156, 175; 726/1, 6, 10
See application file for complete search history.

(56) References Cited

U.S. PATENT DOCUMENTS

| | | | |
|---|---|---|---|
| 6,842,863 B1 | 1/2005 | Fox et al. | |
| 7,072,870 B2 * | 7/2006 | Tallent et al. | 705/76 |
| 7,383,434 B2 * | 6/2008 | Wildish et al. | 713/157 |
| 7,814,315 B2 * | 10/2010 | Parkinson | 713/158 |
| 8,028,333 B2 * | 9/2011 | Falch et al. | 726/10 |
| 8,407,464 B2 * | 3/2013 | Salowey et al. | 713/156 |
| 8,516,133 B2 * | 8/2013 | Smeets et al. | 709/228 |
| 8,533,463 B2 * | 9/2013 | Parkinson | 713/158 |
| 8,583,917 B2 * | 11/2013 | Parkinson | 713/158 |
| 8,621,204 B2 * | 12/2013 | Edstrom et al. | 713/156 |
| 8,621,206 B2 * | 12/2013 | Chang | 713/156 |
| 8,627,063 B2 * | 1/2014 | Edstrom et al. | 713/156 |
| 2002/0116646 A1 * | 8/2002 | Mont et al. | 713/201 |
| 2002/0116647 A1 * | 8/2002 | Mont et al. | 713/201 |
| 2005/0114666 A1 * | 5/2005 | Sudia | 713/175 |

(Continued)

OTHER PUBLICATIONS

Zhao, Xu; Wenyan, Zhai; Shanshan, Cao; "New Certificate Status Verification Scheme Based on OCSP for Wireless Environment", International Forum on Computer Science-Technology and Applications, Dec. 25-27, 2009, pp. 195-198.*

(Continued)

*Primary Examiner* — Victor Lesniewski
(74) *Attorney, Agent, or Firm* — Daniel R. Bestor

(57) ABSTRACT

A relying party obtains a certificate of a certificate subject and acquires a status information object for the certificate. The relying party validates the certificate using information in the status information object and compares authorization attributes present in the status information object with policy attributes associated with the requested service. A policy attribute is a set of constraints used by the relying party to determine if the authorization attributes associated with the certificate subject are sufficient to allow the certificate subject to access the requested service. If the authorization attributes present in the status information object match the policy attributes associated with the requested service, the relying party may grant the certificate subject access to the requested service.

16 Claims, 4 Drawing Sheets

(56) References Cited

U.S. PATENT DOCUMENTS

| | | | |
|---|---|---|---|
| 2006/0179008 A1* | 8/2006 | Tallent et al. | 705/75 |
| 2008/0086634 A1* | 4/2008 | Salowey et al. | 713/156 |
| 2008/0133907 A1* | 6/2008 | Parkinson | 713/158 |
| 2008/0133908 A1* | 6/2008 | Parkinson | 713/158 |
| 2008/0148046 A1* | 6/2008 | Glancey | 713/156 |
| 2008/0183851 A1* | 7/2008 | Puthupparambil et al. | 709/223 |
| 2009/0063855 A1* | 3/2009 | Parkinson | 713/158 |
| 2009/0205028 A1* | 8/2009 | Smeets et al. | 726/6 |
| 2010/0318791 A1* | 12/2010 | Shamsaasef et al. | 713/158 |
| 2011/0088090 A1* | 4/2011 | O'Brien et al. | 726/19 |
| 2011/0113239 A1* | 5/2011 | Fu et al. | 713/156 |
| 2011/0113240 A1* | 5/2011 | Fu et al. | 713/156 |
| 2011/0154026 A1* | 6/2011 | Edstrom et al. | 713/158 |
| 2011/0161663 A1* | 6/2011 | Nakhjiri | 713/158 |
| 2011/0213963 A1* | 9/2011 | Wnuk | 713/158 |
| 2012/0054848 A1* | 3/2012 | Salowey et al. | 726/10 |

OTHER PUBLICATIONS

Shen, Shigen; Yue, Guangxue; "Unified Certificate Validation System DNS-OCSP", International Symposium on Electronic Commerce and Security, Aug. 3-5, 2008, pp. 394-397.*

Zhang, Shaomin; Gong, Huitao; Wang, Baoyi; "An Extended OCSP Protocol for Grid CA Cross-certification", Second International Conference on Semantics, Knowledge and Grid, Nov. 1-3, 2006, 2 pages.*

S. Blake-Wilson, et al.; RFC 4366; Network Working Group; "Transport Layer Security (TLS) Extensions"; Apr. 2006; 26 Pages.

S. Farrell, et al.; Network Working Group; Request for Comments: 3281; "An Internet Attribute Certificate Profile for Authorization"; Apr. 2002; 26 Pages.

C. Rigney, et al.; Network Working Group; Request for Comments: 2865; "Remote Authentication Dial in User Service (RADIUS)"; Jun. 2000; 64 Pages.

M. Chiba, et al.; Network Working Group Request for Comments: 3576; "Dynamic Authorization Extensions to Remote Authentication Dial in User Service (RADIUS)"; Jul. 2003; 26 Pages.

D. Nelson, et al.;Network Working Group Request for Comments: 5607; "Remote Authentication Dial-In User Service (RADIUS) Authorization for Network Access Server (NAS) Management"; Jul. 2009; 26 Pages.

M. Myers, et al.; Network Working Group Request for Comments: 2560; "X.509 Internet Public Key Infrastructure Online Certificate Status Protocol—OCSP"; Jun. 1999; 20 Pages.

Phillip Hallum-Baker; Internet Draft; draft-ietf-pkix-ocspx-00.txt; "OCSP Extensions"; Sep. 3, 1999; 15 Pages.

PCT International Search Report Dated Feb. 21, 2013 for Counterpart Application PCT/US2012/059523.

* cited by examiner

METHOD AND APPARATUS FOR AUTHENTICATING A DIGITAL CERTIFICATE STATUS AND AUTHORIZATION CREDENTIALS

FIELD OF THE DISCLOSURE

The present disclosure relates generally to authenticating digital certificates and more particularly to providing a cost effective manner for authenticating both an identity certificate and an authorization attribute presented by a certificate subject.

BACKGROUND

Public Key Infrastructure (PKI) provides a protocol for implementing authentication using public key cryptography. PKI allows for asymmetric cryptography, wherein different keys are used for encryption and decryption. In particular, a pair of keys, one public and one private is generated for each user for encryption and decryption. To ensure the trustworthiness of public/private keys, certificate authorities (CA) issue digital key certificates. The digital key certificates are digitally signed by the CA to guarantee that an individual providing a digital certificate (also simply referred to herein as certificate) is, in fact, who the individual claims to be. Each digital key certificate includes, among other information, a name of a certificate subject, a serial number, an expiration date, the certificate subject's public key, and the digital signature of the issuing CA. The certificate subject is an entity for which the content of the certificate applies. It is understood that by issuing the certificate, the issuer of the certificate is asserting through the certificate that the content of the certificate applies to the certificate subject. Thereafter, when the certificate subject presents the certificate to relying parties, the relying parties can authenticate the identity of the certificate subject. When the relying party needs to identify a certificate subject, it will perform an activity commonly referred to an authentication. When the relying uses digital certificates to authenticate the certificate subject, the authentication process typically involves two main steps, validating the certificate subject's certificate, and verifying the certificate subject has access to a private key associated with the certificate subject's certificate. This second step is commonly done by validating the certificate subject's signature on various data originated in part by the relying party and subsequently signed by the certificate subject with the private key associated with the certificate subject's certificate.

Digital certificates may need to be revoked prior to expiry. For example, if the certificate subject ceases to be trusted, perhaps because the attributes included in the certificate have changed, or if the certificate subject's private key is stolen or otherwise compromised, signatures made by the certificate subject's private key can no longer be trusted and so the certificate must be revoked. The revoked certificate is published in a certificate status information database, such as a Certificate Revocation List (CRL). When a relying party uses the certificate to authenticate a certificate subject, the relying party may determine the revocation status of the certificate by directly accessing the certificate status information database, such as the CRL or by using an online certificate status protocol (OCSP) or a Server-based Certificate Validation Protocol (SCVP).

Determining the revocation status of a certificate is commonly referred to as determining the status of the certificate, therefore the terms revocation status, status and certificate status are used synonymously herein. Certificate validation commonly refers to a process where the statuses of multiple certificates in a chain are determined. The result of certificate validation is presented in a certificate validation information object that includes an indication of whether to accept or reject the certificate being validated. The process of certificate validation is equivalent to determining the certificate status when there is only one certificate in a chain. The phrase of "determining certificate status" includes functions for determining the certificate validation information object. The phrase "certificate status" includes the status of individual certificates, the status of multiple certificates in a chain, or the certificate validation information object.

The certificate subject may request services offered by the relying party. When the certificate subject requests a service from the relying party, the relying party verifies that authorization attributes associated with the certificate subject match the authorization attributes associated with the requested service. Authorization attributes can be encoded in many forms. For example, authorization attributes may take the form of a predefined Object ID (OID), where multiple parties in a domain have been configured to know that each OID value corresponds to an authorized service or set of services. The OID may take the form of a string of numbers such as 1.2.3.4. When OIDs are represented as a string of numbers it may be known that if, for example, 1.2.3 is authorized for a given certificate subject then 1.2.3.X is also authorized for that certificate subject. Authorization attributes may also take the form of, for example, an index into a table of authorized services, a function name, a role name or identifier, a user name, an X500 Distinguished Name component, a DNS Fully Qualified Domain Name or a component thereof, an IP address or protocol port identifier.

If the certificate subject's authorization attributes match those associated with the requested service, the relying party grants the certificate subject access to the requested service. A match between certificate subject's authorization attributes and the authorization attributes associated with the requested service does not imply that they are identically equal. The relying party could implement at least one predefined rule that determines what is considered as a match and what is not considered as a match. For example, the rule may indicate that a certificate subject's attribute within a predefined range is considered a match with authorization attributes associated with a requested service; a certificate subject's attribute below or above a certain threshold is considered a match with authorization attributes associated with a requested service; a parameter with a particular bit-set is considered a match with the authorization attributes associated with a requested service; and/or the presence or absence of a certain limiting parameter is considered a match with the authorization attributes associated with a requested service.

In some cases the certificate subject's authorization attributes may be included in the digital certificate such that the digital certificate includes an identity attribute that identifies the certificate subject and authorization attributes that identify the certificate subject's privileges. In successfully authenticating the digital certificate, the relying party may therefore be assured of both the identity and authorization attributes of the certificate subject. However, identity and authorization attributes are typically incompatible because the identity attribute is intended to last for a longer time period than authorization attributes, which inherently need to change whenever the privileges of the certificate subject change. By including the authorization attributes into the identity certificate, the certificate subject is required to acquire a new identity certificate whenever the authorization attributes associated with the certificate subject change.

Acquiring the identity certificate more often than needed can raise the cost of operating the PKI.

Alternatively, the authorization attribute may be separated from the identity certificate; i.e., the authorization attribute is included in an attribute certificate. One advantage of this approach is that the identity certificate does not need to be updated every time the authorization attributes associated with the certificate subject changes. However, an entirely new system of certificate management is required to manage the attribute certificate.

As an alternative, some organizations use PKI for identity authentication and use a backend server for validating the authorization attributes. Typically, the backend server includes a list of roles with which the certificate subject is associated. These roles are transmitted to the relying party authenticating the certificate subject for the relying party to use in determining which, if any, of the offered services the certificate subject is authorized to access. All of the alternatives presented above require that when the relying party is authenticating the identity and authorization attributes associated with the certificate subject, the relying party must be connected to both the PKI and the attribute certificate management infrastructure. The attribute certificate management infrastructure may include an Authentication, Authorization, and Accounting (AAA) server, a Remote Authentication Dial-In User Service (RADIUS) server, or a Domain Controller.

To eliminate the need for connectivity with the PKI when the relying party is authenticating the certificate subject's identity, one approach allows for each certificate subject to periodically acquire its status from the CRL or to obtain an OCSP status for its certificate from an OCSP server. Thereafter, when presenting its digital certificate to the relying party for authentication, the certificate subject provides a cached copy of its CRL status or the OCSP status to the relying party. If the relying party determines through validation policies the status information is sufficiently current, the relying party may accept the certificate as valid. This approach ensures that the certificate identity status is highly available but it does not provide an avenue for the relying party to validate authorization credentials presented by the certificate subject without connectivity to the attribute certificate management infrastructure.

Accordingly, a method is needed to easily and affordably authenticate both the identity and the authorization attributes of the certificate subject, without requiring connectivity to back-end infrastructure during authentication.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
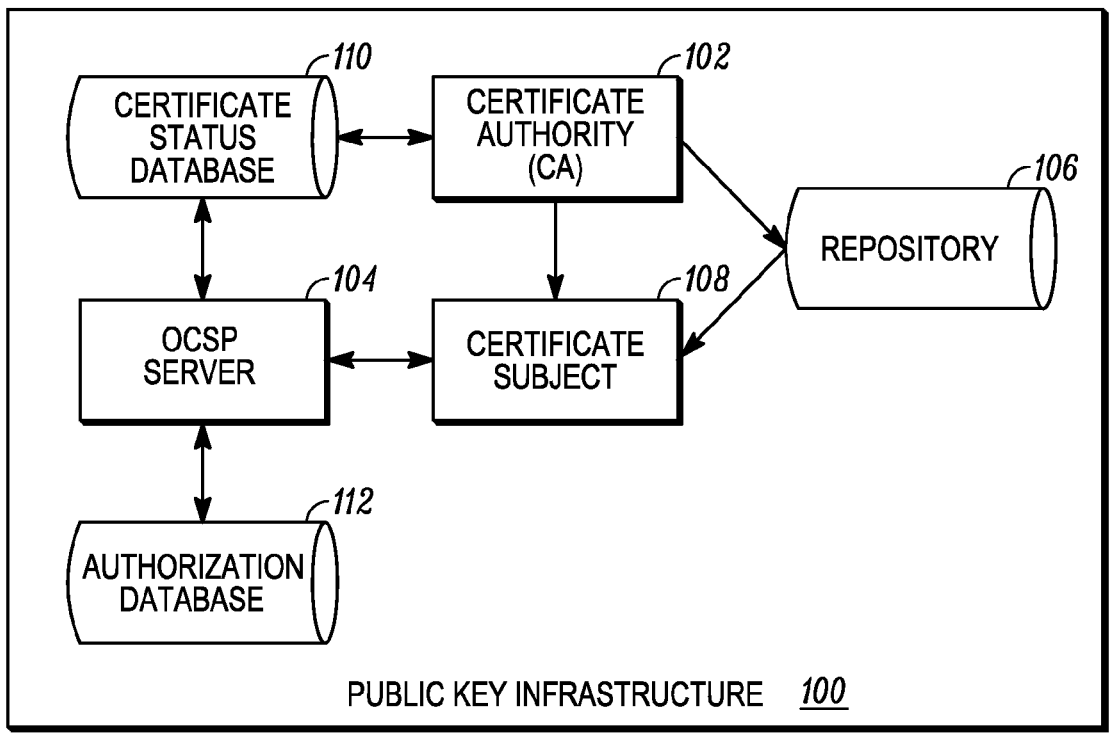
FIG. 1 is a block diagram of the public key infrastructure used in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Some embodiments are directed to methods and apparatuses for determining an authorization status for a requested service. A relying party obtains a certificate of a certificate subject and acquires a status information object for the certificate. The relying party validates the certificate using information in the status information object and compares authorization attributes present in the status information object with policy attributes associated with the requested service. A policy attribute is a set of constraints used by the relying party to determine if the authorization attributes associated with the certificate subject are sufficient to allow the certificate subject to access the requested service. If the authorization attributes present in the status information object match the policy attributes associated with the requested service, the relying party may grant the certificate subject access to the requested service.

FIG. 1 is a block diagram of the public key infrastructure used in accordance with some embodiments. A public key infrastructure (PKI) 100 enables public key management and includes at least one certificate authority (CA) 102. CA 102 issues public key certificates, each of which attests that a public key embedded in a digital certificate (also simply referred to herein as certificate) indeed belongs to a certificate subject 108. It is therefore the obligation of CA 102 to verify the identity of certificate subject 108 prior to issuing the associated public key certificate so that relying parties can trust the information in the digital certificates issued by CA 102.

Although only one CA 102 is shown in FIG. 1 for ease of illustration, more than one CA may be included in a PKI. CA 102 may be a commercial CA which issues certificates that may be trusted by web browsers used by the general public or CA 102 may be associated with a domain, an organization, or government entity, for example. When more than one CA is included in the PKI, trust relationships may exist between the CAs.

In public key cryptography, a private key associated with the public key is known only to certificate subject 108. The corresponding public key is made publicly available (as part of the digital certificate) and is stored in a publicly accessible repository 106. Certificate subject 108 may thereafter use the private key to decrypt data that another party has encrypted with the certificate subject's public key obtained from repository 106. In addition to encrypting messages (which ensures privacy), certificate subject 108 can use the private key to digitally sign information before it is transmitted to another party. Another party may then verify certificate subject 108 digital signature using certificate subject 108 certificate.

Certificate subject 108 may be authorized to access certain services offered by a relying party. The attributes associated with authorized credentials/privileges may be included in the digital certificate assigned to certificate subject 108. When the relying party receives a digital certificate with information associated with certificate subject 108, the relying party authenticates both the identity of certificate subject 108 and the authorization attributes presented in the digital certificate.

The functions of CA 102, the relying party, and certificate subject 108 are implemented by processors included in, for example, personal computers, servers, or smart phones that are configured to process data. Therefore, the operations discussed herein as being performed by CA 102, the relying party, and certificate subject 108 are implemented on the associated processors of CA 102, the relying party, and certificate subject 108.

Digital certificates may be revoked, and a revoked certificate may be published in a certificate status information database 110. Certificate status information database 110 may be, for example, a Certificate Revocation List (CRL), a database access by an Online Certificate Status Protocol (OCSP) server, or a server-based Certificate Validation Protocol (SCVP) source. The scope of the discussion herein is applicable to any source of certificate status information. An OCSP server or validating server referred to herein is typically a general purpose server configured to provide certificate status information, including CRL, OCSP responses, or SCVP responses. An OCSP request referred to herein may be any generic request for certificate status information and an OCSP response referred to herein may be any generic response containing certificate status information. At regular intervals, CA 102 updates certificate status information database 110 and issues an updated certificate status information database which includes a list of revoked certificates. A recent certificate status information database for CA 102 must be checked as part of the digital certificate validation process.

To facilitate authentication of the certificate subject's identity and authorization attributes without requiring that the relying party be connected to backend infrastructure, in an embodiment, certificate subject 108 is configured to periodically obtain its certificate status and associated authorization attributes. In particular, certificate subject 108 sends a status request to, for example, an OCSP server 104. OCSP server 104 queries certificate status information database 110 to determine if the digital certificate has been revoked. OCSP server 104 also queries authorization attributes with an authorization database 112. Authorization database 112 may be, for example, an authentication, authorization, and accounting (AAA) server that handles user requests for access to computer resources. The AAA server may also provide authentication, authorization, and accounting services for enterprise users.

Although the discussion herein is directed to querying two sources for the status information and the authorization credentials, OCSP server 104 may be configured to query one or more sources to obtain the certificate status and the associated authorization attributes. In addition, although the discussion is mostly directed to the certificate subject requesting the status of its digital certificate and authorization attributes, any entity including the relying party can make the request. Furthermore, it should also be noted that, a status request to OCSP server 104 may include a request for multiple certificates that may be associated with one or more subjects and/or one or more authorization attributes associated with one or more requested services.

In response to the status request, OCSP server 104 returns a response with a status information object. The status information object may be, for example, a data structure which includes information associated with the status of one or more certificates (certificate status information data) and one or more authorization attributes, each of which may be associated with one or more certificate subjects. Furthermore, the status information object may include a currency indicator such as time of day, sequence number, expiration dates, or next update time. The integrity of the status information object may be cryptographically protected using a digital signature or a Message Authentication Code (MAC). The privacy of the status information object may also be cryptographically protected via known encryption mechanisms. In addition, the authorization attributes and the certificate status information data may each be cryptographically protected independently or as a combined object.

Figure 3:
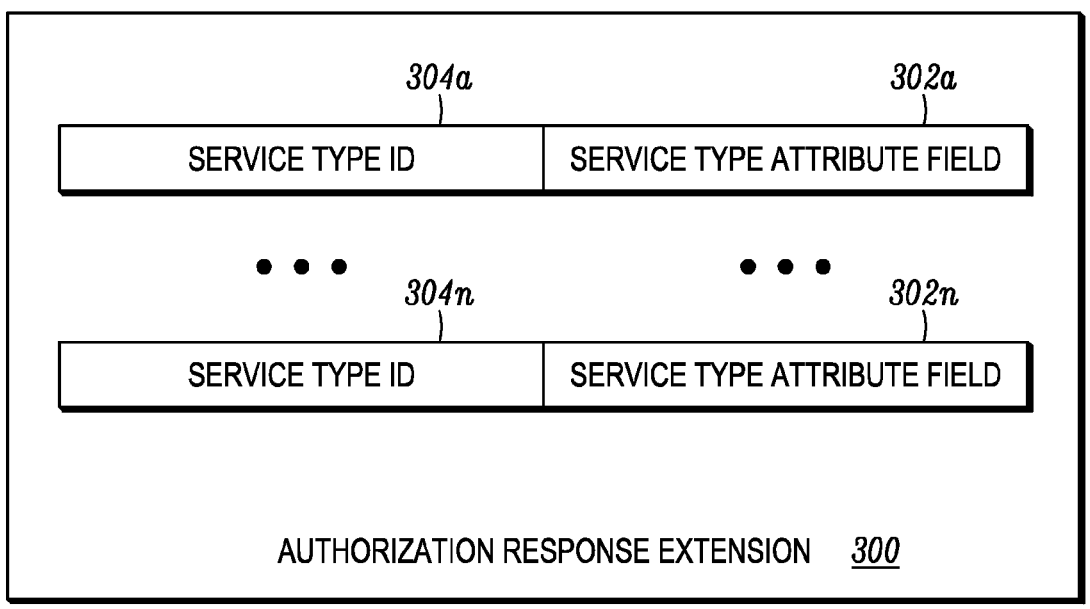
FIG. 3 is a block diagram of an authorization response extension used in accordance with some embodiments.

In one embodiment, OSCP Server 104 may choose to authenticate the status request (remove: the Certificate Subject 108), before generating a Authorization Response Extension 300, as shown in FIG. 3 below, or transmitting the OCSP response. It will be appreciated by one skilled in the art that Server-Based Certificate Validation Protocol (SCVP), as specified for example in the Internet Engineering Task Force (IETF) Request for Comment (RFC) 5055, also provides certificate status information similar to how OCSP works. However SCVP can inherently provide certificate status information for many certificates needed to build a chain of certificates from a certificate subject's certificate to a relying party's trusted certification authority (remove: self signed certificate), and check the certificate status of all the certificates in the chain. Such functionality is often referred to as Certificate Validation. OCSP is therefore functionally equivalent to SVCP where the certificate chain contains only one certificate. SCVP requests referred to herein are treated identically to OCSP requests, and SCVP responses are treated identically to OCSP responses. Therefore the term OCSP used herein should be taken to include SCVP. Therefore the terms OCSP response, OCSP request, and OCSP server are taken to include SCVP response, SCVP request, and SCVP server respectively. Similarly the terms OCSP Server is used synonymously with Certificate Status Server and Certificate Validating Server.

The relying party can use the above certificate validation methods to determine if it should provide a requested service to a certificate subject. The relying party would do this by acquiring certificate subject's digital certificate, and certificate status information associated with the subject's certificate containing certificate status information and authorization attributes. The relying party would then authenticate the certificate status information by validating the signature on the certificate status information with the certificate of the validating server. The relying party would then use the certificate status to validate the digital certificate of the certificate subject. The relying party would then determine the identity of the certificate subject by sending the certificate subject some data to sign. After receiving the signed data, the relying party would then verify the signature on the signed data. Finally, by comparing the authorization attributes with the local authorization policy the relying party can determine whether on or not to provide the requested service based on the result of the comparison.

In one embodiment, when access to one or more requested services is being authorized for multiple certificate subjects, the status information object may include a data object for each certificate subject being authorized. This data object may include both certificate status information data and authorization attributes.

The status information object can be used to validate at least one certificate. One method of doing this is to verify the cryptographically protected integrity of the status information object, extract the appropriate certificate status information data for the at least one certificate, and determine, based on the value of the status information, the validity of the at least one certificate. For example, the certificate status information object may include a flag indicating whether or not the at least one certificate is valid.

In one embodiment, the status request may contain an identification of the specific service being requested. Such identification may take the form of at least one of the following; a Universal Resource Locator (URL), a service name defined in a predetermined naming convention, a distinguished name and Domain Name System (DNS) fully qualified domain name, an IP address, a protocol port number (such as a TCP or UDP port), a process ID, an Application Programming Interface (API) name, a function name, or an index into a redefined table of services.

When the status request sent to OCSP server 104 identifies specific services, the status of the certificate for certificate subject 108 and the authorization attributes associated with the services requested by certificate subject 108 may be included in the certificate status information object sent in response to the status request. If the status request sent to OCSP server 104 does not identify specific services, the status of the certificate for certificate subject 108 and the authorization attributes associated with services that certificate subject 108 is authorized to access may be included in the certificate status information object sent in response to the status request. Thus, a response to a status request for multiple certificate status information objects may include the requested certificate status of each certificate subject and the corresponding authorization attributes associated with any or all of the certificate subjects, wherein the authorization attributes may be associated with either requested services or authorized services.

In an embodiment, a requesting entity, for example certificate subject 108, initiates the authentication process by periodically sending an authorization request extension to OCSP server 104. The authorization request extension includes an indication of a service being requested and the authorization attributes required for that requested service. The authorization request extension may be integrated into a modified OCSP request message, for example in a modified version of a standardized IETF OCSP request message. Alternatively, the authorization request extension may be appended to the standardized IETF OCSP request message. The OCSP request message with the authorization request extension may also include one or more attributes, associated with certificate subject 108, that are to be validated. In one embodiment, the authorization request extension may identify a list of authorization attributes that are to be included in a response message sent from OCSP server 104. For example, the authorization request extension may include a specific service type for each authorization attribute needed. The authorization request extension may also include an explicit list of authorization attribute types. An authorization attribute type is an identifier that OCSP server 104 can use to determine which authorization attributes are needed by the requesting entity. In one embodiment, an authorization attribute type is an identifier that indicates a class of services or one of many service that are available at a given relying party or group of relying parties. For example, an authorization attribute type might specify "Voice Service" or "Data Services", or more specifically, "database lookup services". Similarly, an authorization attribute type may specify "all services available at a service provider (X)" or "all voice service available at the service provider (X)". The actual encoding of the authorization attribute type may take the form of, for example, a name, an OID, an index into a service types table, an IP address or a protocol port id, among other options.

If the authorization request extension includes a service type, the response message from the OCSP server 104 may include authorization attributes associated with the service type. OCSP server 104 may determine which authorization attributes are associated with an authorization type in many ways. For example, the authorization attribute type may be an OID with fewer digits than the actual corresponding attribute OIDs. For example, OID 1.2.3 may be used to encode an attribute type while the authorization attributes of this attribute type may be encoded as 1.2.3.x or 1.2.3.x.y. Attribute types may be grouped in other ways including predefined tables of attribute type identifiers and the corresponding attribute identifiers, or predefined naming rules. For example, "all group calling" might be an attribute of a service type, "voice services". The authorization attribute may also be a simple indication, such as an "authorized" or "not authorized" indication.

If the request extension includes an explicit list of attribute types, then the response message from OCSP server 104 may include authorization attributes associated with the listed attribute types. If neither a service type nor an attribute type is included in the authorization request extension, the response message from OCSP server 104 may include all or part of the authorized attributes associated with certificate subject 108. The OCSP server 104 may use filtering criteria in determining which authorization attributes are applicable for the certificate subject 108. The filtering criteria may be, for example, the identity or attributes associated with the requesting entity, time of day, location, any field included in the certificate subject's certificate including a certificate policy, a distinguished name, an assurance level, or an identifier for the issuing CA.

Upon receiving the OCSP request with the authorization request extension, OCSP server 104 determines the certificate subject's status by querying the appropriate certificate status information database 110. If the status of subject's certificate is determined to be valid, OCSP server 104 also queries database 112 (for example AAA server) to obtain the authorization attributes associated with the certificate subject 108 and the services indicated in the status request. OCSP server 104 may communicate with the AAA server via, for example, a Lightweight Directory Access Protocol (LDAP), or Structured Query Language (SQL) or Remote Authentication Dial-In User Service (RADIUS).

Upon obtaining the certificate status and authorization attributes for certificate subject 108, OCSP server 104 includes the authorization attributes in an authorization response extension contained within, for example, a standard OCSP response. The OCSP response also includes the status of the digital certificate. OCSP server 104 sends the OCSP response with the authorization response extension to certificate subject 108. In an embodiment, the OCSP response is digitally signed by OCSP server 104 to guarantee its integrity and to guarantee that it originated from an authorized OCSP server. The digitally signed response therefore includes the status of the certificate subject 108 digital certificate and authorization attributes associated with certificate subject 108. In an embodiment, the OCSP response may include the status information object. The status information object may be a modified OCSP response that is configured to include one or more of the certificate status, authorization attributes and the OCSP server signature.

Certificate subject 108 caches the modified OCSP response or status information object. Thereafter, when certificate subject 108 sends information to the relying party, certificate subject 108 also sends the cached status response or status information object with the digital certificate. The relying party can therefore use the received status response or status information object to verify the status of the certificate subject 108 digital certificate and to obtain the authorization attributes associated with certificate subject 108. In particular, the relying party validates certificate subject 108's digital certificate using information in the status information object and compares authorization attributes present in the status information object with policy attributes associated with a requested service. A policy attribute is a set of constraints used by the relying party to determine if the authorization attributes associated with certificate subject 108 are sufficient to allow certificate subject 108 to access the requested service. If the authorization attributes present in the status information object match the policy attributes associated with the requested service, the relying party grants certificate subject 108 access to the requested service.

By including certificate subject 108 certificate status and authorization attributes along with the certificate subject's digital certificate, in some embodiments, the relying party can verify the identity and authorization attributes of certificate subject 108 without needing connectivity to a back-end server. Authorization attributes can thus be changed frequently and easily without requiring that a new identity certificate be issued to certificate subject 108.

In one embodiment, certificate subject 108 acts as an Extensible Authentication Protocol (EAP) supplicant and OCSP server 104 acts like an EAP authenticator. In communications using EAP, the EAP supplicant may request connection to a wireless network through an access point (a station that transmits and receives data). The EAP authenticator then requests identification (ID) data from the EAP supplicant and transmits that data to an authentication server. The authentication server asks the EAP authenticator for proof of the validity of the ID. After the EAP authenticator obtains that verification from the EAP supplicant and sends it back to the authentication server, the EAP supplicant may be connected to the network as requested. Therefore, OCSP server 104 acts as the EAP authenticator and forwards EAP messages between authorization server 112 and certificate subject 108. When the OCSP server receives an EAP Success message from authorization server 112, OCSP server 104 retrieves the authorization attributes from the EAP Success message and inserts the authorization attributes into the OCSP response sent to certificate subject 108.

Figure 2:
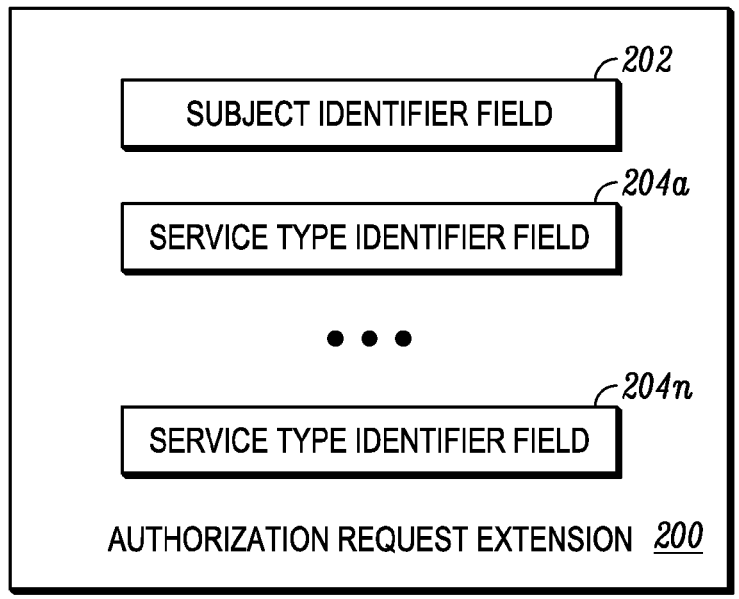
FIG. 2 is a block diagram of an authorization request extension used in accordance with some embodiments.

FIG. 2 is a block diagram of an authorization request extension used in accordance with some embodiments. Authorization request extension 200 may be appended to a currently used request, for example, an OCSP request. Authorization request extension 200 includes a subject identifier field 202 that includes the identification used for the certificate subject. The identification could be the certificate subject's domain name, parts of the certificate subject's domain name, the certificate subject's alternate name or alias, or a CP OID representing a role. A CP OID is an identifier in the form of a registered Object Identifier (OID) identifying a Certificate Policy (CP). The CP OID is commonly used by the relying party to assist in determining if the certificate subject can access a requested service. Authorization request extension 200 may include one or more service type identifier field 204a-204n, each of which identifies applications for which the certificate subject is requesting authorization attributes. The information in service type identifier field 204 could be a pre-defined number, a predefined name or text string, the domain name associated with a service, a role associated with the certificate subject, a network name, an access control rule set to be applied to this certificate subject 108, or an OID identifying an application for which the certificate subject is requesting authorization attributes. If no service type identifiers are present in service type identifier field 204, the authorization attributes for all or part of the services for which the certificate subject is authorized to access are returned in response to authorization request extension 200.

FIG. 3 is a block diagram of an authorization response extension used in accordance with some embodiments. The OSCP server includes authorization attributes for the certificate subject in an authorization response extension 300. Authorization response extension 300 is provided within a response, for example an OCSP response, sent to the certificate subject, to the relying party, or other entity requesting the status of the certificate subject's digital certificate and authorization attributes. Authorization response extension 300 includes service type attribute fields 302a-302n, each of which may include one or more authorization attributes returned by the authorization server. Service type attributes field 302 may include attributes for parameters associated with, for example, authorization attributes (which can be in the form of a CP OID), an access uniform resource locator (URL), a predefined name or text string, the domain name associated with a service, a role associated with the certificate subject, an IP address, or a port number, a network name, or an access control rule set to be applied to this certificate subject 108, or a simple flag to indicate whether the subject is authorized for a service associated with the service type that this attribute is associated with. If there is no service type field 204a-204n listed in the authorization request extension, the corresponding authorization response extension may have only one set of attributes which are applicable to all service types. In this case, a service type ID 304, associated with service type attribute fields 302, would indicate, for example, "ALL_SERVICES", or the service type ID 304a-304n, could be omitted from the authorization response extension. In one embodiment, the OCSP server may cache previously obtained CRL or authorization attributes and include the cached information in the authorization response extension.

The periodicity of polling for the authorization attributes and status of certificate by the certificate subject can be optimized. If, for example, the certificate subject determines the nature of a current interface, i.e. whether it is on wired or a wireless interface, the certificate subject can reduce the polling frequency based on the current interface. For example, the certificate subject may reduce the polling frequency if the current interface is a wireless interface. An embodiment may involve the use of two modes of operation, a normal mode and an emergency mode. The normal mode may be set as a default mode of operation and the emergency mode may be invoked when there is, for example, a natural disaster or a national emergency. In the emergency mode, the certificate subject may poll for authorization attributes and the status of certificate more frequently. Furthermore, the certificate subject may also be able to poll for authorization attributes and the certificate status in an on-demand mode, that is, the certificate subject may also be able to poll for information as needed.

Figure 4:
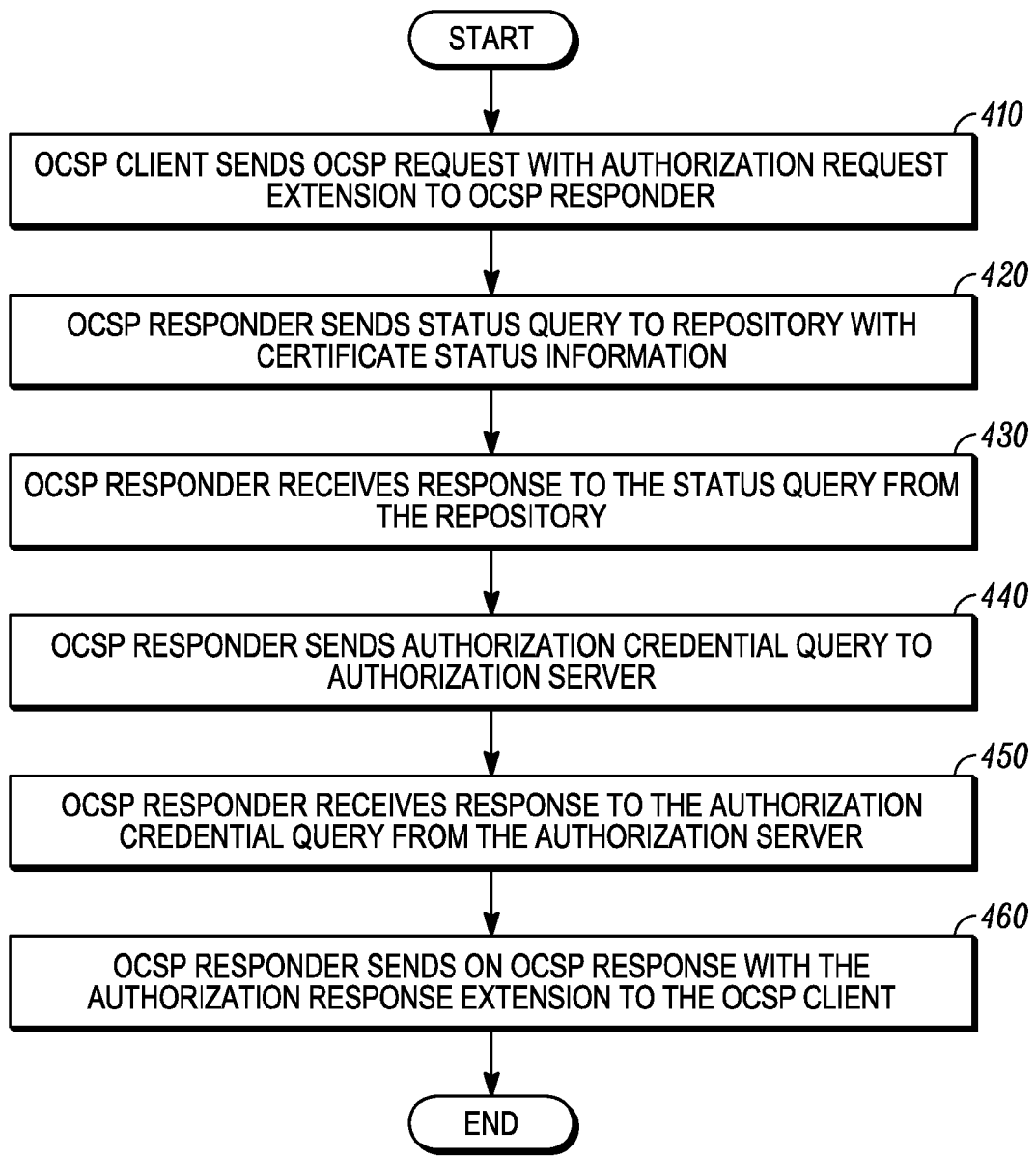
FIG. 4 is a flow diagram of the authentication process used in some embodiments.

FIG. 4 is a flow diagram of the authentication process used in some embodiments. In 410, an OCSP client, which may be the relying party or the certificate subject, sends an OCSP request with an authorization request extension to an OCSP responder. The OCSP request may include a protocol version, at least one service type identifier field which identifies services (also refer to as applications) for which the certificate subject is requesting authorization attributes, and a certificate subject identifier. In 420, the OCSP responder sends a status query to a repository, such as a CRL repository, with certificate status information. The status query includes the certificate identifier. In 430, the OCSP responder receives a response to the status query from the repository. In 440, the OCSP responder sends an authorization credential query to an authorization server. The authorization credential query includes the certificate identifier, the certificate, or a set of attributes from the subject's certificate such as Distinguished Name components, certificate policies OID, or one or more service type IDs 204a-204n. In 450, the OCSP responder receives a response to the authorization attributes query from the authorization server. In 460, the OCSP responder sends an OCSP response with the authorization response extension to the OCSP client. The OCSP response may include a version of the response extension 300, the name of the OCSP responder, and responses for each of the certificates in the authorization request extension.

Figure 5:
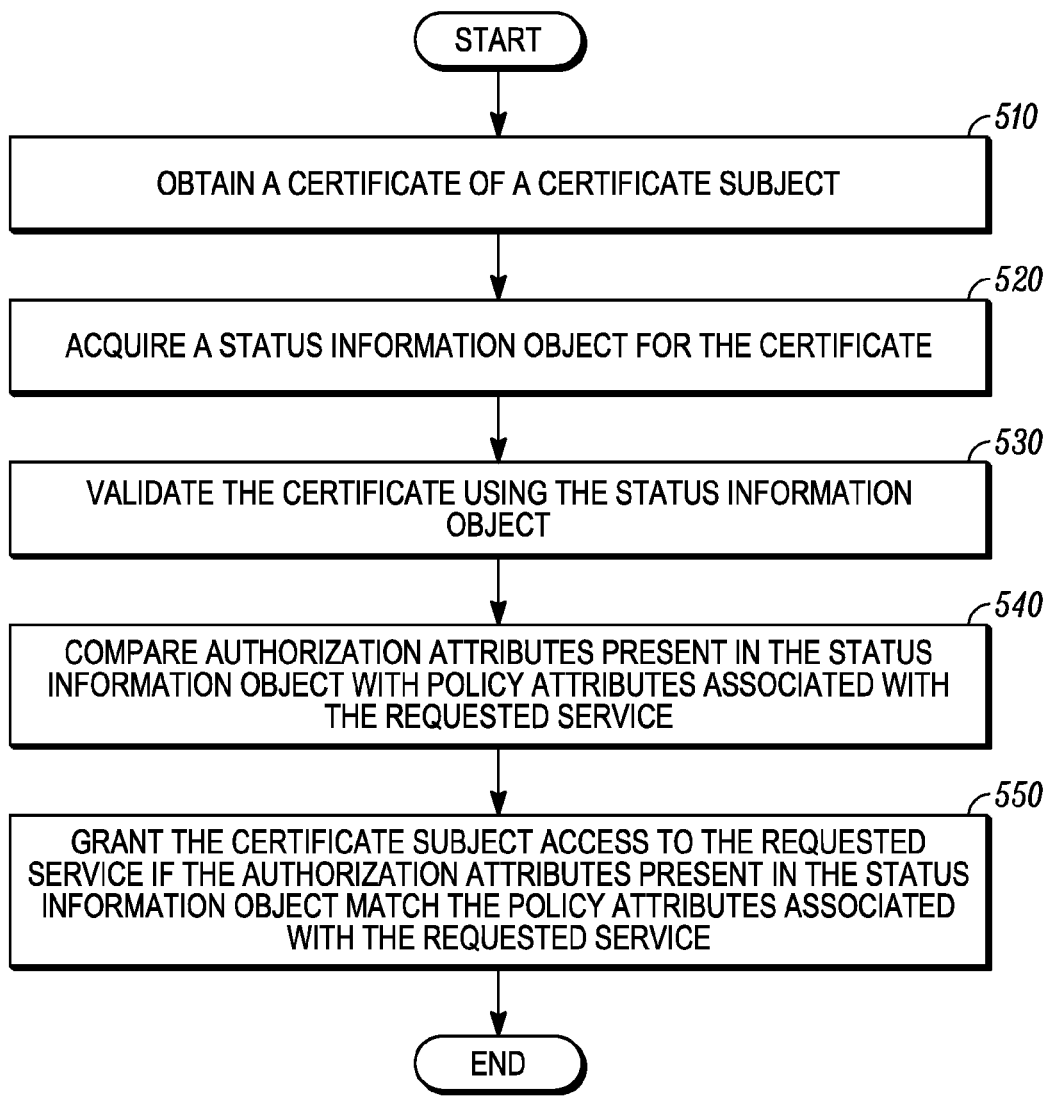
FIG. 5 is a flow diagram of a method of determining an authorization status for a requested service at a relying party used in some embodiments.

FIG. 5 is a flow diagram of a method of determining an authorization status for a requested service at a relying party in accordance with some embodiments. In 510, the relying party obtains a certificate of a certificate subject. In 520, the relying party acquires a status information object for the certificate. In 530, the relying party validates the certificate using the status information object. In 540, the relying party compares authorization attributes present in the status information object with policy attributes associated with the requested service. In 550, the relying party grants the certificate subject access to the requested service if the authorization attributes present in the status information object match the policy attributes associated with the requested service.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of determining, at a relying party processing device, an authentication and authorization status of a certificate subject making a request for a requested service at the relying party, the method comprising:

receiving, at the relying party processing device and from the certificate subject, a request for the requested service at the relying party processing device accompanying a certificate of the certificate subject and a validation server provided status information object for the certificate, the validation server provided status information object including an aggregation of (i) certificate validity status information indicative of a validity of the certificate and (ii) authorization attributes indicative of services that the certificate subject is authorized to access;

validating, by the relying party processing device, the certificate using the certificate validity status information from the status information object;

comparing, by the relying party processing device, the authorization attributes present in the status information object with access policy attributes associated with the requested service; and granting, by the relying party processing device, the certificate subject access to the requested service if (i) the certificate is validated using the certificate validity status information from the status information object and (ii) the authorization attributes present in the status information object match the access policy attributes associated with the requested service;

wherein the use of the status information object at the relying party processing device allows the relying party processing device to carry out authentication and authorization of the certificate subject using the contents of the status information object alone.

2. The method of claim 1, wherein the validation server provided status information object is an online certificate status protocol (OCSP) response modified to include authorization attributes and certificate status information.

3. The method of claim 1, wherein the validation server provided status information object is a server-based certificate validation protocol (SCVP) response modified to include authorization attributes signed by an authorization server.

4. The method of claim 1, wherein the validation server provided status information object received from the certificate subject is cryptographically protected by the validation server, the method further comprising verifying, by the relying party processing device, an integrity of the validation server provided status information object prior to validating the certificate using the certificate validity status information.

5. A method for obtaining access to a requested service at a relying party by providing authentication and authorization attributes of a service requesting certificate subject to the relying party, the method comprising:

prior to requesting the requested service at the relying party:

sending, by the certificate subject, a certificate status request to a certificate validation server requesting validity status of a certificate associated with the certificate subject;

receiving, by the certificate subject and from the certificate validation server, a status information object in response to the status request, the status information object including an aggregation of (i) certificate validity status information indicative of a validity of the certificate and (ii) authorization attributes indicative of services that the certificate subject is authorized to access; and after receiving the status information object, providing, by the certificate subject, the status information object with the certificate to a relying party processing device to gain access to the requested service at the relying party processing device;

wherein the status information object includes sufficient information to allow the certificate subject to be authenticated and authorized by the relying party processing device for access to the requested service using the contents of the status information object alone.

6. The method of claim 5, wherein the sending the certificate status request further comprises sending a request extension within the status request, wherein the request extension includes at least one service that the certificate subject needs to access, and the receiving comprises receiving the status information object with authorization attributes.

7. The method of claim 5, wherein the sending the certificate status request further comprises sending a request extension within the status request, wherein the request extension includes no services that the certificate subject needs to access, and the receiving comprises receiving the status information object with authorization attributes which are applicable to at least one service the certificate subject is authorized to access.

8. The method of claim 5, wherein the sending the certificate status request further comprises sending a request extension within the status request, wherein the request extension includes at least one authorization attribute type, and the receiving comprises receiving the status information object with corresponding authorization attributes.

9. The method of claim 5, wherein the status information object received from the validation server is cryptographically protected by the validation server.

10. A method for determining at a relying party processing device, an authentication and authorization status of a certificate subject making a request for a requested service at the relying party processing device, the method comprising:

prior to requesting the requested service at the relying party processing device, sending, by the certificate subject, a certificate status request to a certificate validation server requesting validity status of a certificate associated with the certificate subject;

receiving, by the certificate validation server, the certificate status request from the certificate subject;

obtaining, by the certificate validation server via a first message exchange with a certificate status database, a validation status for the certificate associated with the certificate subject indicative of a validity of the certificate;

obtaining, by the certificate validation server via a second message exchange with an authorization database, authorization attributes associated with the certificate subject indicative of services at the relying party processing device that the service requesting certificate subject is authorized to access, wherein the second message exchange is separate from the first message exchange;

aggregating, by the certificate validation server, the validation status for the certificate and the authorization attributes, both associated with the certificate subject, into a status information object;

sending, by the certificate validation server, the status information object to the certificate subject;

receiving, by the certificate subject and from the certificate validation server, the status information object; and after receiving the status information object, providing, by the certificate subject, the status information object with the certificate to the relying party processing device for validation and to gain access to the requested service at the relying party processing device;

wherein the status information object includes sufficient information to allow the certificate subject to be authenticated and authorized by the relying party processing device for access to the requested service using the contents of the status information object alone.

11. The method of claim 10, further comprising:
prior to sending the status information object to the certificate subject, cryptographically protecting, by the certificate validation server, the status information object.

12. The method of claim 10, wherein the status information object is an online certificate status protocol (OCSP) response modified to include authorization attributes and certificate status information.

13. The method of claim 10, wherein the status information object is a server-based certificate validation protocol (SCVP) response modified to include authorization attributes signed by an authorization server.

14. The method of claim 10, wherein the authorization database is a database stored at an authentication, authorization and accounting (AAA) server.

15. The method of clam 10, wherein the receiving the certificate status request further comprises receiving a request extension within the certificate status request, wherein the request extension includes at least one service or service type that the certificate subject needs to access, wherein the obtaining comprises obtaining the authorization attributes for the at least one service from a remote authorization server.

16. The method of claim 10, wherein the receiving the certificate status request further comprises receiving a request extension within the certificate status request, wherein the request extension includes no services or service types that the certificate subject needs to access, and wherein the obtaining comprises obtaining authorized credentials which are applicable to at least one service the certificate subject is authorized to access from a remote authorization server.

* * * * *

UNITED STATES PATENT AND TRADEMARK OFFICE
CERTIFICATE OF CORRECTION

| | | |
|---|---|---|
| PATENT NO. | : 8,806,196 B2 | Page 1 of 1 |
| APPLICATION NO. | : 13/289356 | |
| DATED | : August 12, 2014 | |
| INVENTOR(S) | : Anthony R. Metke et al. | |

It is certified that error appears in the above-identified patent and that said Letters Patent is hereby corrected as shown below:

IN THE DRAWINGS:

In Fig. 4, Sheet 3 of 4, for Tag "460", in Line 1, delete "ON" and insert -- AN --, therefor.

IN THE SPECIFICATION:

In Column 4, Line 48, delete "FIG. 1" and insert -- FIG. 1, --, therefor.

In Column 6, Line 17, delete "OSCP" and insert -- OCSP --, therefor.

In Column 6, Line 33, delete "SVCP" and insert -- SCVP --, therefor.

In Column 10, Line 13, delete "OSCP" and insert -- OCSP --, therefor.

Signed and Sealed this
Seventeenth Day of May, 2016

Michelle K. Lee
*Director of the United States Patent and Trademark Office*